US012574747B2

(12) United States Patent
Ahmed et al.

(10) Patent No.: US 12,574,747 B2
(45) Date of Patent: Mar. 10, 2026

(54) SYSTEMS FOR ENABLING COMMUNICATIONS OVER SHARED SPECTRUM USING O-RAN FRONTHAUL INTERFACE IN RADIO ACCESS NETWORKS

(71) Applicant: Mavenir Systems, Inc., Richardson, TX (US)

(72) Inventors: Wessam Afifi Ahmed, Plano, TX (US); Rasiklal Kachhla, Plano, TX (US); Neil Piercy, Royston (GB)

(73) Assignee: Mavenir Systems, Inc., Richardson, TX (US)

( * ) Notice: Subject to any disclaimer, the term of this patent is extended or adjusted under 35 U.S.C. 154(b) by 869 days.

(21) Appl. No.: 17/723,563

(22) Filed: Apr. 19, 2022

(65) Prior Publication Data

US 2022/0345896 A1 Oct. 27, 2022

Related U.S. Application Data

(60) Provisional application No. 63/178,226, filed on Apr. 22, 2021, provisional application No. 63/186,463, filed on May 10, 2021.

(51) Int. Cl.
*H04W 16/00* (2009.01)
*H04W 16/14* (2009.01)
(Continued)

(52) U.S. Cl.
CPC ........... *H04W 16/14* (2013.01); *H04W 24/10* (2013.01); *H04W 60/04* (2013.01); *H04W 72/23* (2023.01); *H04W 92/12* (2013.01)

(58) Field of Classification Search
None
See application file for complete search history.

(56) References Cited

U.S. PATENT DOCUMENTS

| 11,432,284 B2 * | 8/2022 | Hmimy ............. H04W 72/0453 |
| 2020/0305159 A1 | 9/2020 | Raghothaman et al. |
| 2021/0195447 A1 | 6/2021 | Taneja et al. |

FOREIGN PATENT DOCUMENTS

| CN | 113498076 A * | 10/2021 | ............ H04W 24/02 |
| WO | 2019070095 A1 | 4/2019 | |

OTHER PUBLICATIONS

Extended European Search Report for corresponding European Application EP22169259.3, 25 pages, dated Dec. 25, 2022.

(Continued)

*Primary Examiner* — Gerald A Smarth
(74) *Attorney, Agent, or Firm* — Ruggiero McAllister & McMahon LLC

(57) ABSTRACT

A method of operating an Open Radio Access Network (O-RAN) fronthaul interface between O-RAN radio unit (O-RU) and an O-RU controller for controlling the O-RU includes: sending, from the O-RU to the O-RU controller, a message informing whether the O-RU supports Citizens Broadband Radio Service (CBRS) operation; and if so, sending from the O-RU to the O-RU controller a report of capabilities of the O-RU including whether spectrum measurement is supported; if the O-RU supports spectrum measurement, providing an indication the O-RU supports either measurement without grant or measurement with gram from a Spectrum Access System (SAS); and sending from the O-RU to the O-RU controller a Federal Communications Commission certification identification (FCC ID) for the O-RU, Citizens Broadband Radio Service Device (CBSD) category for the O-RU, user registration identification (userId) for CBRS, installation parameters, grouping parameters, and/or a call sign device identifier provided by the FCC.

14 Claims, 8 Drawing Sheets

(51) Int. Cl.

| | |
|---|---|
| *H04W 24/10* | (2009.01) |
| *H04W 60/04* | (2009.01) |
| *H04W 72/23* | (2023.01) |
| *H04W 92/12* | (2009.01) |

(56) References Cited

OTHER PUBLICATIONS

O-RAN Working Group 4.Cus.0-v05.00"O-RAN Fronthaul Working Group; Control, User and Synchronization Plane Specification",Feb. 28, 2021 (Feb. 28, 2021), pp. 1-292, XP055960973,O-Ran Alliance.

"O-RAN: Towards an Open and Smart RAN", ITU-T Draft; Study Period 2017-2020; Focus Group NET-2030, International Telecommunication Union, Geneva; CH vol. net-2030; White Paper Oct. 2018, pp. 1-19.

Chunduri U et al: "Transport Network aware Mobility for 5G draft-ietf-dmm-tn-aware-mobility-00; draft-ietf-dmm-tn-aware-mobility-00.txt", Transport Network Aware Mobility for 5G draft-ietf-dmm-tn-aware- mobility-00; draft-ietf-dmm-tn-aware-mobility-00.txt; Internet—Draft: DMM Working Group, Internet Engineering Task Force, IETF; Standard; Mar. 9, 2021(pp. 1-24).

Partial European Search Report for corresponding European Application EP22169259.3, 22 pages, dated Oct. 17, 2022.

O-RAN Alliance Working Group 4 "WG4.MP.0-v05.00 Technical Specification—Management Plane Specification" Feb. 28, 2021.

Winnf: "Signaling Protocols and Procedures for Citizens Broadband Radio Service (CBRS): Spectrum Access System (SAS)—Citizens Broadband Radio Service Device (CBSD) Interface Technical Specification Spectrum Sharing Committee Work Group 3 (CBRS Protocols) SAS-CBSD TS WINNF-TS-0016-VI.2.5", May 18, 2020 pp. 1-52, The Software Defined Radio Forum, Inc. 2020 [retrieved on Sep. 7, 2020].

WiseSense GMBH et al: "Contribution to clause 5.3.2 a.EUR" Introduction to CBRS, ETSI Draft; RRSWG1(17) 039A004, European Telecommunications Standards Institute (ETSI), 650, Route Des Lucioles; F-06921 Sophia-Antipolis; France, Oct. 10, 2017.

* cited by examiner

SYSTEMS FOR ENABLING COMMUNICATIONS OVER SHARED SPECTRUM USING O-RAN FRONTHAUL INTERFACE IN RADIO ACCESS NETWORKS

CROSS-REFERENCE TO RELATED APPLICATIONS

The present application claims the benefit of U.S. Provisional Patent Application No. 63/178,226, filed on Apr. 22, 2021, and U.S. Provisional Patent Application No. 63/186, 463, filed on May 10, 2021, which are incorporated by reference herein in their entirety.

BACKGROUND OF THE DISCLOSURE

1. Field of the Disclosure

The present disclosure relates to systems and methods for Radio Access Networks (RANs), and relates more particularly to Open RANs (O-RANs) for $4^{th}$-Generation (4G) and $5^{th}$-Generation (5G) based mobile networks.

2. Description of the Related Art

Conventional RANs were built employing an integrated unit where the entire RAN was processed. Conventional RANs implement the protocol stack (e.g., Physical Layer (PHY), Media Access Control (MAC), Radio Link Control (RLC), Packet Data Convergence Control (PDCP) layers) at the base station (also referred to as the evolved node B (eNodeB or eNB) for 4G LTE or next generation node B (gNodeB or gNB) for 5G NR). In addition, conventional RANs use application specific hardware for processing, which make the conventional RANs difficult to upgrade and evolve. As future networks evolve to have massive densification of networks to support increased capacity requirements, there is a growing need to reduce the capital costs (CAPEX) and operating costs (OPEX) of RAN deployment and make the solution scalable and easy to upgrade.

Cloud-based Radio Access Networks (CRANs) are networks where a significant portion of the RAN layer processing is performed at a baseband unit (BBU), located in the cloud on commercial off the shelf servers, while the radio frequency (RF) and real-time critical functions can be processed in the remote radio unit (RRU), also referred to as the radio unit (RU). The BBU can be split into two parts: centralized unit (CU) and distributed unit (DU). CUs are usually located in the cloud on commercial off the shelf servers, while DUs can be distributed. The BBU may also be virtualized, in which case it is also known as vBBU. Radio Frequency (RF) interface and real-time critical functions can be processed in the remote radio unit (RRU).

For the RRU and DU to communicate, an interface called the fronthaul is provided. $3^{rd}$ Generation Partnership Project (3GPP) has defined 8 options for the split between the BBU and the RRU among different layers of the protocol stack. There are multiple factors affecting the selection of the fronthaul split option such as bandwidth, latency, implementation cost, virtualization benefits, complexity of the fronthaul interface, expansion flexibility, computing power, and memory requirement. One of the splits recently standardized by O-RAN Alliance is split option 7-2× (Intra-Physical (PHY) layer split). In the uplink (UL), Fast Fourier Transform (FFT), Cyclic Prefix (CP) removal, and possibly prefiltering functions reside in the RU, while the rest of PHY functions reside in the DU. In the downlink (DL), inverse Fast Fourier Transform (iFFT), CP addition, and beamforming functions reside in the RU, the rest of PHY functions reside in the DU. This split has multiple advantages such as simplicity, transport bandwidth scalability, beamforming support, interoperability, support for advanced receivers and inter-cell coordination, lower O-RU complexity, future proof-ness, interface and functions symmetry.

One of the technologies recently standardized is operation over shared spectrum such as Citizens Broadband Radio Service (CBRS) band in the U.S. from 3.55 GHz-3.7 GHz. Similar shared spectrum paradigms also exist in other countries. CBRS opens new ways to use spectrum in the 3.5 GHz band in the US by sharing spectrum across legacy and new users. There are 3 tiers of users sharing the CBRS band. The first tier includes "incumbents," who are legacy/existing users of the CBRS band, e.g., military ship-borne radars in coastal areas, military ground-based radars, fixed satellite services (FSS) receive-only earth stations (35 sites around US, mostly in coastal areas), and Grandfathered Wireless Broadband Licensees (GWBL). The second tier includes Priority Access License (PAL) users, who are CBRS devices (CBSDs) having one or more licenses to use a portion of the CBRS band. PAL users, who have a lower priority than incumbents, are restricted to a total of 70 MHz within 3.55-3.65 GHz band in the CBRS band. The third tier includes General Authorized Access (GAA) users, who are CBSDs using the CBRS band without holding a license. GAA users, who have a lower priority than PAL users, are the lowest tier of the 3-tier architecture. GAA users can only use the spectrum if no incumbents or PAL users are using the channel at a given location. GAA users have access to the entire 150 MHz of the CBRS band.

FIG. 1 shows the architecture of an example interface between Spectrum Access System (SAS) 1001 and CBSD/ Domain Proxy (DP) 1002. CBSD includes, e.g., fixed stations and/or radios, or networks of such stations or radios, that operate on a PAL or GAA basis consistent with the regulations specified in Title 47 of the Code of Federal Regulations (CFR), § 96. For CBSDs which comprise multiple nodes or networks of nodes, CBSD requirements apply to each node even if network management and communication with the SAS is accomplished via a single network interface. CBSD obtains Grants from the SAS via the SAS-CBSD interface (which may be done with the assistance of DP 1002 in the communication path, or directly between SAS and CBSD, as shown in the example embodiment shown in FIG. 1). The DP 1002 is a logical entity engaging in communications with the SAS on behalf of multiple individual CBSDs or networks of CBSDs. The DP can also provide a translational capability to interface legacy radio equipment in the 3650-3700 MHz band with a SAS to ensure compliance with the regulations specified in Title 47 of the Code of Federal Regulations (CFR), § 96 (hereinafter referred to as 47 CFR § 96). The DP presents a consistent and secure interface to the SAS that can convey all messages pertaining to the SAS-CBSD interface for client CBSDs. CBSD aggregation and proxy function for large networks can be integrated within a Service Management and Orchestration (SMO) system or in a standalone node. SAS 1001 is a system that authorizes and manages use of spectrum for the CBRS in accordance with the regulations specified in 47 CFR § 96.

For communications over CBRS, the standards/procedures defined by the Wireless Innovation Forum (WInnForum) and CBRS Alliance consider the whole gNB (which is a CBSD) as a single node. In contrast, the standards/ procedures defined by the O-RAN Alliance disaggregates the RAN into multiple nodes that can be physically separated (i.e., O-RU, O-DU, O-CU, and SMO). Because definitions and rules for the CBRS-based messages and procedures for an O-RAN-based architecture do not exist in the known art, for an O-RAN based network (in which gNB is disaggregated into RU, DU, CU, and SMO) to operate over the CBRS band, proprietary solutions are needed between different vendors of the RU, DU, CU, and SMO. An example proprietary solution includes using offline methods to retrieve the needed parameters via system provisioning.

Therefore, there is a need for a method to enable the nodes of an O-RAN based network to operate over the CBRS band with interoperability across different RU and DU vendors without requiring proprietary solutions.

SUMMARY OF THE DISCLOSURE

The present disclosure provides a method for enabling communications over shared spectrum, e.g., CBRS band, in an O-RAN-compliant network, which method involves exchanging messages between an O-RAN compliant RU (O-RU) and an O-RAN compliant DU (O-DU) and the Service Management and Orchestration (SMO) system via the O-RAN fronthaul interface. The method according to the present disclosure enables CBRS operation over the O-RAN-compliant network by providing the required parameters, which are obtained over the O-RAN fronthaul interface, to the external SAS. The required parameters enable the SAS to allocate channels to CBRS O-RUs and manage inter-reference across different tiers/users sharing the spectrum.

An example method according to the present disclosure enables CBRS functionalities in an O-RAN-based architecture by defining new CBRS parameters and messages to be exchanged among O-RU, O-DU, and a controller unit that controls O-RU. The controller that controls O-RU ("O-RU controller") can be implemented in the SMO, O-DU or a separate entity, e.g., Network Management System (NMS). For the sake of brevity, the term "SMO/O-RU controller" will be used in the present disclosure to mean i) an SMO that controls O-RU (i.e., acting as O-RU controller) and/or ii) a controller implemented in an O-DU or a separate entity, e.g., NMS, for controlling O-RU. In addition, the term "O-RU controller" is intended to encompass an SMO that controls O-RU. The CBRS functionalities in the O-RAN-defined network elements can include, without limitation, the following: CBSD registration procedure; CBSD spectrum inquiry procedure; CBSD grant procedure; CBSD heartbeat procedure; CBSD grant relinquishment procedure; and CBSD deregistration procedure.

According to an example method according to the present disclosure, O-RU is requested to execute spectrum measurements and report measurement results back to the SMO/O-RU controller unit.

An example method according to the present disclosure for operating an Open Radio Access Network (O-RAN) fronthaul interface between O-RAN radio unit (O-RU) and an O-RU controller for controlling the O-RU includes: sending, from the O-RU to the O-RU controller, a message informing whether the O-RU supports Citizens Broadband Radio Service (CBRS) operation; and if the O-RU supports the CBRS operation, sending from the O-RU to the O-RU controller a report of capabilities of the O-RU, wherein the report includes: i) an indication of whether the O-RU supports spectrum measurement; ii) if the O-RU supports spectrum measurement, one of an indication the O-RU supports measurement without grant from a Spectrum Access System (SAS) or an indication the O-RU supports measurement with grant from the SAS; and iii) at least one of Federal Communications Commission certification identification (FCC ID) for the O-RU, Citizens Broadband Radio Service Device (CBSD) category for the O-RU, user registration identification (userId) for CBRS, installation parameters, grouping parameters, and a call sign device identifier provided by the FCC.

An example method according to the present disclosure for operating an Open Radio Access Network (O-RAN) fronthaul interface between O-RAN radio unit (O-RU) and an O-RU controller for controlling the O-RU includes: sending, by the O-RU controller, a measurement request message to the O-RU requesting the O-RU to perform spectrum measurement based on at least one configuration parameter included in the measurement request message; and sending, by the O-RU, a message to the O-RU controller including results of the spectrum measurement performed by the O-RU.

An example method according to the present disclosure for operating an Open Radio Access Network (O-RAN) fronthaul interface between O-RAN radio unit (O-RU) and an O-RU controller for controlling the O-RU includes: providing an interface between the O-RU controller and a domain proxy (DP); exchanging a specified set of messages between a spectrum access system (SAS) and the DP over the interface; and exchanging the same specified set of messages between the O-RU controller and the DP over the interface.

DETAILED DESCRIPTION

Figure 1:
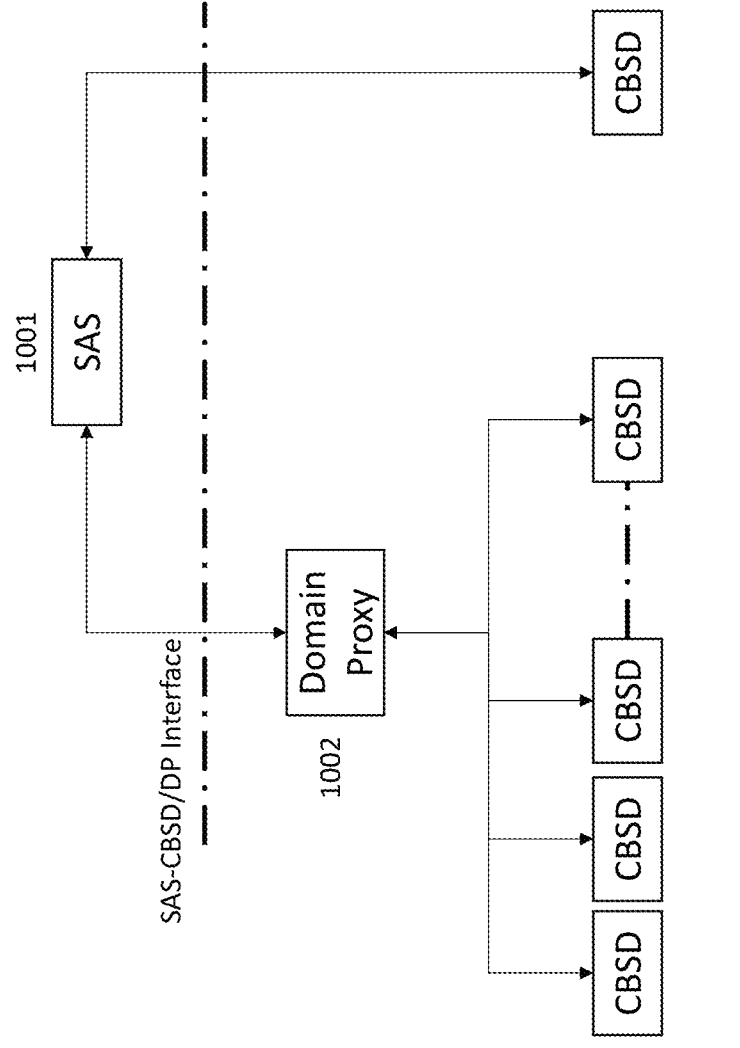
FIG. 1 illustrates the architecture of an example interface between Spectrum Access System (SAS) and CBSD/Domain Proxy (DP).
Figure 2A:
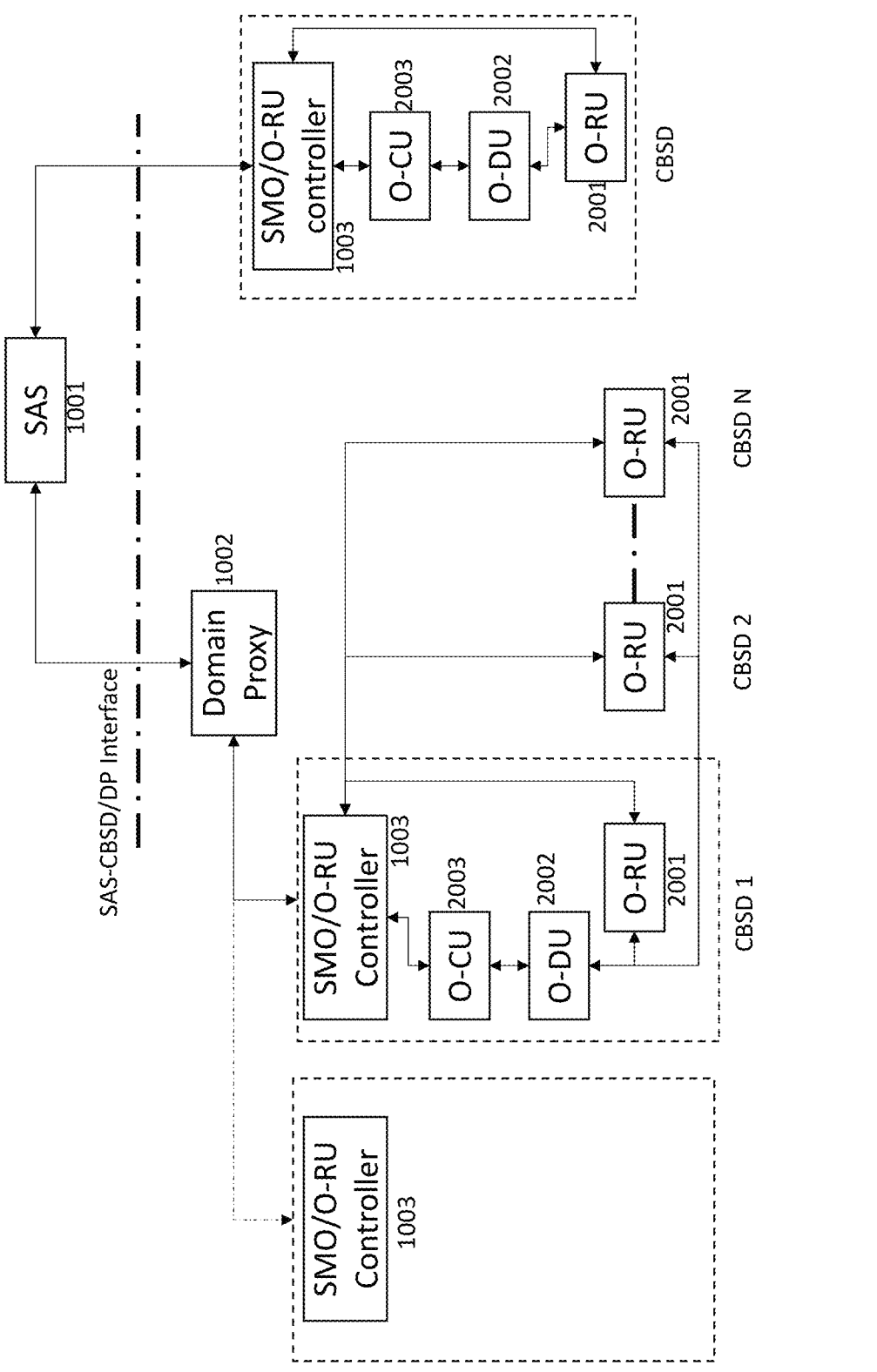
FIG. 2a illustrates an example embodiment of an O-RAN-based system for CBRS networks including the SAS-CBSD/DP interface based on the O-RAN alliance architecture.

In an example embodiment of the present disclosure, a new method enables CBRS functionalities in an O-RAN-compliant network by defining new CBRS parameters and messages to be exchanged among O-RU, O-DU, and SMO/O-RU controller. FIG. 2a illustrates an example embodiment of an O-RAN-based system for CBRS networks including the SAS-CBSD/DP interface based on the O-RAN Alliance architecture. FIG. 2a shows the disaggregation of the CBSD into multiple nodes (i.e., O-RU 2001, O-DU 2002, O-CU 2003, and SMO/O-RU controller 1003) as per the O-RAN alliance definition. Among the multiple CBSDs shown in FIG. 2a, only CBSD 1 is explicitly shown with O-RU 2001, O-DU 2002, O-CU 2003, and SMO/O-RU controller 1003. The remaining CBSDs (CBSD 2 and CBSD N) are illustrated with only O-RU 2001 explicitly shown for the sake of brevity, but it should be noted that CBSD 2 and CBSD N also include O-DU 2002, O-CU 2003, and SMO/O-RU controller 1003. In addition, the O-RU controller can be implemented in the SMO, O-DU or a separate entity, e.g., Network Management System (NMS). As shown in FIG. 2a, the communication between SAS and CBSD can be done directly (e.g., as shown on the right side of FIG. 2a), or via DP (e.g., when DP is handling multiple CBSDs).

Figure 2B:
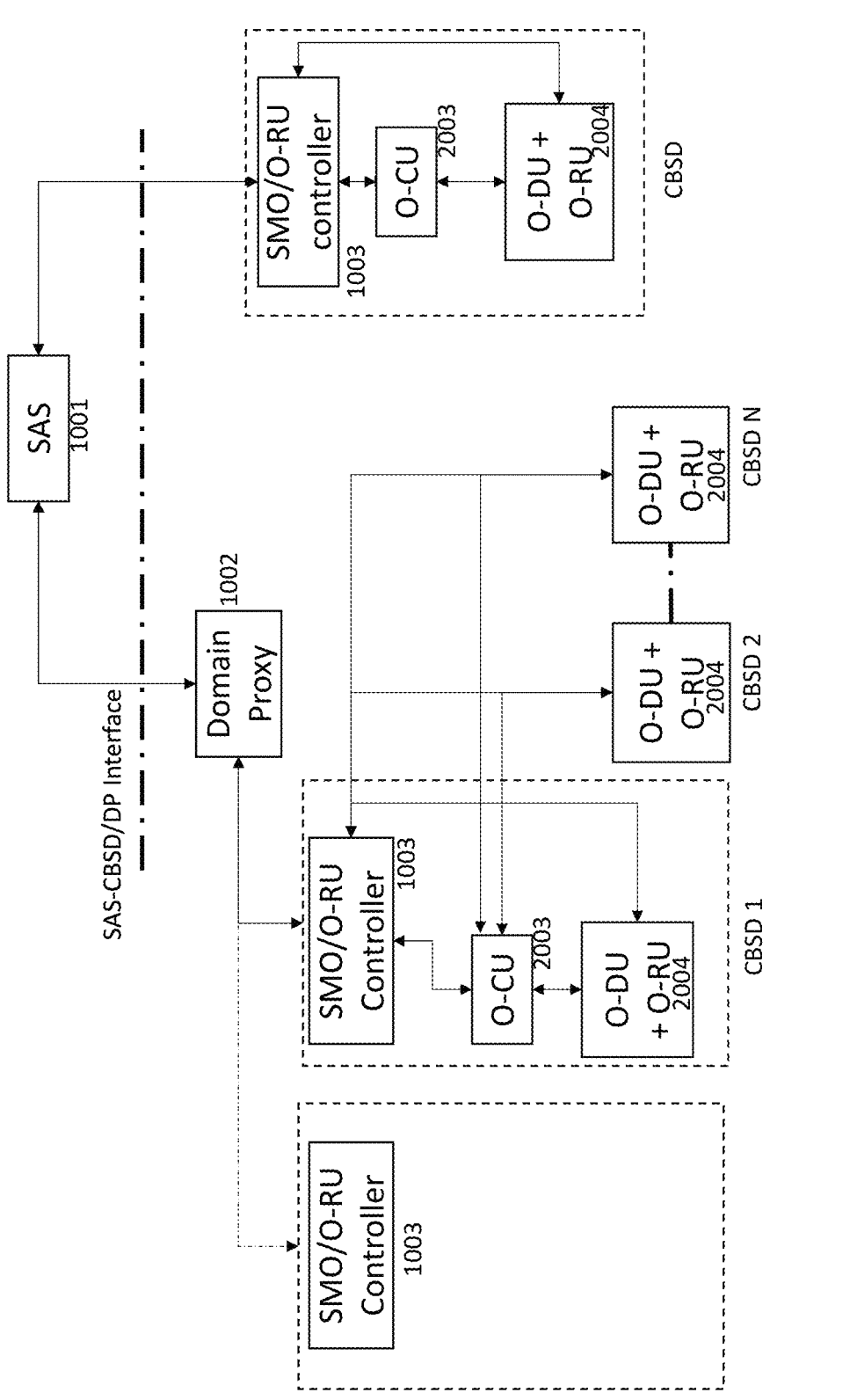
FIG. 2b illustrates an example embodiment of an O-RAN-based system for CBRS networks including i) the SAS-CBSD/DP interface based on the O-RAN alliance architecture and ii) a combined O-DU and O-RU.

FIG. 2b illustrates an alternative example embodiment of an O-RAN-based system for CBRS networks including i) the SAS-CBSD/DP interface based on the O-RAN alliance architecture and ii) a combined O-DU and O-RU. In contrast to the example embodiment shown in FIG. 2a, O-RU and O-DU are combined in a common node 2004 in the example embodiment of FIG. 2b.

In this section, the capabilities associated with the various network nodes for the implementation of the method according to the present disclosure are described. The O-RU must indicate in a message to the SMO/O-RU controller whether it supports CBRS, which indication enables the SMO/O-RU controller to configure the O-RU to operate in the CBRS band. If the O-RU supports the CBRS feature, the O-RU can report to the SMO/O-RU controller the following parameters as part of the O-RU's capabilities:

a) FCC ID: The FCC certification identifier of the CBSD.

b) CBRS device category: The device category of the CBSD, either "A" or "B" as defined in 47 CFR § 96.

c) userId: The user registration ID, which is the system-wide unique identifier for registered users of the CBRS including CBSD users (i.e., CBRS O-RU) or PAL holders.

d) installationParam: Installation parameters related to the O-RU, e.g.: O-RU coordinates (latitude, longitude, height, height type, horizontal Accuracy, vertical Accuracy); whether the deployment is indoor or outdoor; antenna azimuth; antenna down tilt; antenna gain; eirp Capability; antenna Model; and antenna beamwidth.

d2) Cpi Signature Data (CPI Signature Data):

Protected Header (string)

Encoded Cpi Signed Data (string)

This parameter is calculated by taking the BASE64 encoding of a Cpi Signed Data object Digital Signature (string)

Cpi Signed Data

Fcc Id

Cbsd Serial Number

Installation Parameters: latitude, longitude, height, heightType, horizontalAccuracy, verticalAccuracy, indoorDeployment, antennaAzimuth, antennaDowntilt, antennaGain, eirpCapability, antennaBeamwidth, antennaModel Professional Installer Data Cpi Id Cpi Name Install Certification Time e) groupingParam: Grouping parameters including, e.g., group ID and group type (ICG, CCG, etc.).

f) Call-sign: A device identifier provided by the FCC.

g) Measurement reporting capabilities: Measurement reporting capabilities of the CBRS O-RU, which can include the following:

1) RECEIVED_POWER_WITHOUT_GRANT: Received Power can be measured and reported when the CBRS O-RU does not have a spectrum grant from the SAS.

2) RECEIVED_POWER_WITH_GRANT: Received Power can be measured and reported when the CBRS O-RU has a spectrum grant from the SAS.

3) None: The CBSD/O-RU is not capable of reporting any measurements.

Measurement capabilities. The following measurement capabilities can be included if the O-RU supports measurement with grant or the O-RU supports measurement without grant:

h) Support for used-channel measurement: Whether the O-RU is capable of executing measurements over the channel being used.

i) Maximum buffer size in bytes for holding measurements.

j) Minimum supported bandwidth of the measured channel in Hz.

k) Maximum supported bandwidth of the measured channel in Hz.

l) Minimum measurement duration per channel in microseconds, milliseconds, seconds, or in number of Orthogonal Frequency-Division Multiplexing (OFDM) symbols or number of slots.

m) Maximum measurement duration per channel in microseconds, milliseconds, seconds, or in number of OFDM symbols or number of slots.

n) Maximum number of antennas that can be used for measurements.

o) Minimum supported reporting periodicity in milliseconds, seconds, minutes, hours, or in number of OFDM symbols or number of slots. Conditional on support for periodic-based measurements.

p) Maximum supported reporting periodicity in milliseconds, seconds, minutes, hours, or in number of OFDM symbols or number of slots. Conditional on support for periodic-based measurements.

q) Minimum supported measurement periodicity in milliseconds, seconds, minutes, hours, or in number of OFDM symbols or number of slots. Conditional on support for periodic-based measurements.

r) Maximum supported measurement periodicity in milliseconds, seconds, minutes, hours, or in number of OFDM symbols or number of slots. Conditional on support for periodic-based measurements.

s) List of bands or sub-bands where the O-RU can do measurements. For each list, the O-RU can include:

Measurement frequency start: Frequency of the lowest end of the total supported measured frequency band in Hz.

Measurement frequency end: Frequency of the highest end of the total supported measured frequency band in Hz.

t) Support for measurement averaging across antennas.

u) Support for measurement averaging across measurement occasions.

v) Support for sending raw measurements samples to O-RU controller.

w) Measurement request method support:

Trigger-based (i.e., on-demand): O-RU can support trigger-based (i.e., on-demand) measurement request messages.

Periodic-based: O-RU can support periodic measurement request messages.

x) Support for measurement signal processing at the O-RU, including:

Channel usability: Channel is usable, unusable, or unknown.

Channel RSSI (received signal strength indicator): Estimated channel RSSI in dBm.

Detected Signal E-UTRA Absolute Radio Frequency Channel Number (EARFCN) or new radio Absolute Radio Frequency Channel Number (NR-ARFCN).

Detected signal radio access technology (RAT): LTE, NR, or unknown.

Detected Signal Physical cell identity (PCI).

Detected Signal E-UTRAN Cell Global Identifier (ECGI) or NR Cell Global Identifier (NCGI).

Signal tolerability: Tolerance to interference from the reported signal: Tolerable, Intolerable, unknown.

Reference Signal Received Power (RSRP): estimated RSRP of the detected downlink LTE waveform or estimated SS-RSRP of the detected downlink NR waveform.

Reference Signal Received Quality (RSRQ): estimated RSRQ of the detected downlink LTE waveform or estimated synchronization signal-RSRQ (SS-RSRQ) of the detected downlink NR waveform.

RSRP histogram: A length-48 array, where each element indicates number of occurrences of UE-reported RSRP for this LTE signal or SS-RSRP for this NR signal that fall within each bin.

RSRQ histogram: A length-18 array, where each element indicates number of occurrences of UE-reported RSRQ for this LTE signal or SS-RSRQ for this NR signal that falls within each bin.

In another example embodiment, at least one of the above parameters in the capability report is reported per O-RU end point.

In another example embodiment, at least one of the above parameters in the capability report is assumed to be supported by the O-RU as default if measurement is reported as supported. As an example, the SMO/O-RU controller can assume that the O-RU supports measurements averaging across antennas and across measurement occasions by default if conducting measurement is supported.

In another example embodiment, at least one of the above parameters in the capability report is configured to be measured or calculated for each measured channel by the O-RU and sent in the measurement response message from the O-RU to the SMO/O-RU controller.

In another example embodiment, the CPI signature data is only included in the capability Yang module if the CPI enters the data directly into the O-RU.

In another example embodiment, one or more of the above capability parameters can be optionally included by the O-RU in the capability YANG module (each YANG module defines a hierarchy of data that can be used for NETCONF-based operations, including configuration, state data, Remote Procedure Calls (RPCs) and notifications).

In another example embodiment, the O-RU may report support for at least one of 1) sending the received signal power in units of 5 MHz or 10 MHz, 2) sending raw received signal samples, and 3) doing local processing and reporting the parameters shown above such as Channel usability, Channel RSSI, Detected Signal EARFCN or NR-ARFCN, Detected signal RAT, Detected Signal PCI, Detected Signal ECGI or NCGI, Signal tolerability, RSRP/SS-RSRP, RSRQ/SS-RSRQ, RSRQ histogram, RSRQ histogram.

In another example embodiment, the SMO/O-RU controller may configure the O-RU with at least one of 1) sending the received signal power in units of 5 MHz or 10 MHz, 2) sending raw received signal samples, and 3) doing local processing and reporting the parameters shown above such as Channel usability, Channel RSSI, Detected Signal EARFCN or NR-ARFCN, Detected signal RAT, Detected Signal PCI, Detected Signal ECGI or NCGI, Signal tolerability, RSRP/SS-RSRP, RSRQ/SS-RSRQ, RSRQ histogram, RSRQ histogram.

In another example embodiment, the O-RU may report to the SMO/O-RU controller at least one of 1) the received signal power in units of 5 MHz or 10 MHz, 2) raw received signal samples, and 3) one or more of the parameters shown above such as Channel usability, Channel RSSI, Detected Signal EARFCN or NR-ARFCN, Detected signal RAT, Detected Signal PCI, Detected Signal ECGI or NCGI, Signal tolerability, RSRP/SS-RSRP, RSRQ/SS-RSRQ, RSRQ histogram, RSRQ histogram. In another example embodiment, some of the reported parameters by the O-RU can be a single or multiple arrays based on whether the measurements are averaged or not and based on the number of detected signals.

If the O-RU reports as part of its capabilities that the O-RU can do measurements with a grant, the SMO/O-RU controller configures the O-RU to do spectrum measurements (by sending measurement request message) only after a grant has been granted from the SAS. If the O-RU reports as part of its capabilities that the O-RU can do measurements without a grant, the SMO/O-RU controller configures the O-RU to do spectrum measurements (by sending measurement request message) immediately before initiating the registration procedure with the SAS. In an alternative embodiment according to the present disclosure for an O-RU that can do measurements without a grant, the measurements procedure can be executed immediately after receiving the registration response from the SAS.

If the SMO/O-RU controller determines that the one or more O-RU(s) support the CBRS feature, the SMO/O-RU controller facilitates the following:

1) Start the CBSD O-RU registration process with the SAS by sending/receiving the CBSD registration request/response, respectively.

2) Aggregate the required information from the O-RU(s) and send them to the DP. The DP shall complete the registration process with the SAS by sending/receiving the CBSD(s) registration request/response, respectively.

The SMO/O-RU controller activates the carrier(s) for over-the-air (OTA) operation only after the CBSD is transitioned from the granted state to the authorized state (i.e., after the first heartbeat response from the SAS is received).

Figure 3:
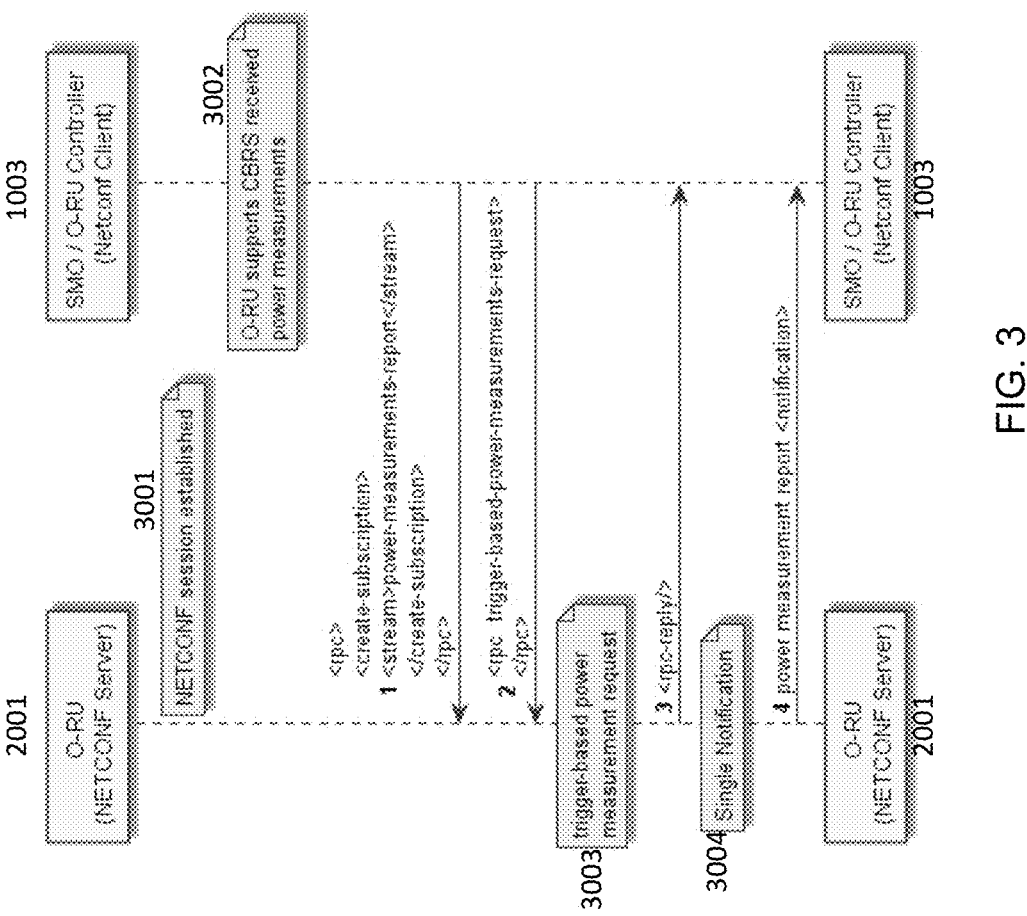
FIG. 3 illustrates one example embodiment of the method according to the present disclosure implementing a "trigger-based power measurement procedure" (or "on-demand power measurement procedure").

In this section, details of spectrum measurements in connection with the example method are provided. One of the main features in shared spectrum such as the CBRS band is performing spectrum measurements to assist the SAS to manage interference across different tiers of users. FIG. 3 shows one example embodiment of the method, which can be referenced as a "trigger-based power measurement procedure," (or "on-demand power measurement procedure") in which the SMO/O-RU controller requests the O-RU to execute spectrum measurements (power measurements) by sending a measurement request message for each time a measurement is needed from the O-RU. As shown at block 3001 in FIG. 3, Network Configuration Protocol (NETCONF) session is initially established. If SMO/O-RU controller 1003 receives (shown at block 3002 in FIG. 3) the indication that the O-RU 2001 supports CBRS received power measurements, then a remote procedure call (RPC) is initiated to create a power-measurement-report stream (as shown by the process arrow 1), and the SMO/O-RU controller 1003 sends a trigger-based (on-demand) power measurement request to the O-RU 2001 (as shown by the RPC process arrow 2 and block 3003). In response, the O-RU 2001 initiates an RPC for a reply (as shown by the process arrow 3) and sends a power measurement report (as shown by the block 3004 and the process arrow 4) to the SMO/O-RU controller 1003.

In the trigger-based (on-demand) power measurement request message sent according to the method shown in FIG. 3, the SMO/O-RU controller 1003 can include the following:

a) Measurement frequency start: Frequency of the lowest end of the total measured frequency band in Hz.

b) Measurement frequency end: Frequency of the highest end of the total measured frequency band in Hz.

c) Measurement bandwidth per channel: Measurement bandwidth in Hz to be used by CBSD to perform the Received Power measurement.

d) Measurement duration per channel: Measurement duration per channel in microseconds, milliseconds, seconds, or in number of OFDM symbols or number of slots.

In another example embodiment of the method according to the present disclosure, the SMO/O-RU controller 1003 can include at least one of the following fields in the trigger-based (on-demand) power measurement request message.

Total number of measured channels: Total number of channels to be measured by the O-RU.

A list of channels where the measurements are requested. For each channel, the following can be included:

a) Measurement channel frequency start: Frequency of the lowest end of the measured frequency channel in Hz.

b) Measurement channel frequency end: Frequency of the highest end of the measured frequency channel in Hz.

c) Measurement bandwidth per channel: Measurement bandwidth in Hz to be used by CBSD to perform the Received Power measurement.

d) Measurement duration per channel: Measurement duration per channel in microseconds, milliseconds, seconds, or in number of OFDM symbols or number of slots.

e) Number of antennas to be used for measurements.

f) Indicator to average measurements across antennas.

g) Indicator to report raw measurement samples per antenna.

h) Indicator to report raw measurement samples but averaged across antennas.

i) start-end time array: Start and end measurement time for a specific channel.

start-time: Indicates the time at beginning of measurement per channel. This parameter is UTC time expressed in the format, YYYY-MMDDThh:mm:ss.

end-time: Indicates the time at end of measurement per channel. This parameter is UTC time expressed in the format, YYYY-MMDDThh:mm:ss.

In another example embodiment of the method according to the present disclosure, the power measurement request message is sent by the SMO/O-RU controller for each time a measurement is needed from the O-RU, but the SMO/O-RU controller shall include only the measurement duration per 10 MHz channel, e.g., in units of microsecond, milliseconds, seconds, or in number of OFDM symbols or number of slots. In this case, the measurement shall include the entire CBRS band from 3.55 GHz to 3.7 GHz, and the measurement bandwidth shall be set to the default value of 10 MHz, as an example.

Figure 4:
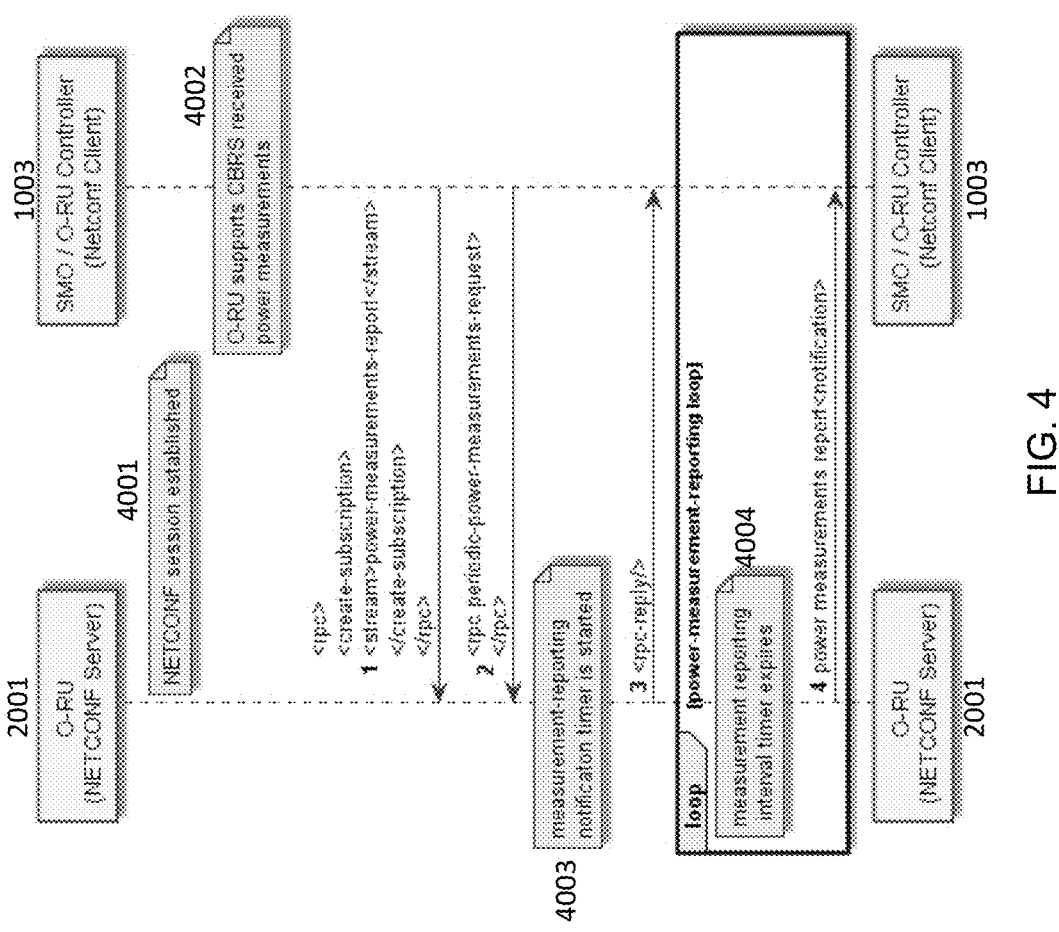
FIG. 4 illustrates one example embodiment of the method according to the present disclosure implementing a "periodic power measurement procedure."

FIG. 4 illustrates an example embodiment of the method, which can be referenced as a "periodic power measurement procedure," in which the power measurement request message is sent by the SMO/O-RU controller 1003 only once (or sent only if parameters update is needed) to the O-RU 2001, and the O-RU 2001 performs the measurements periodically and reports the measurements results periodically via measurement notifications. As shown at block 4001 in FIG. 4, Network Configuration Protocol (NETCONF) session is initially established. If SMO/O-RU controller 1003 receives (shown at block 4002 in FIG. 4) the indication that the O-RU 2001 supports CBRS received power measurements, then a remote procedure call (RPC) is initiated to create a power-measurement-report stream (as shown by the process arrow 1), and the SMO/O-RU controller 1003 sends a periodic power measurements request to the O-RU 2001 (as shown by the RPC process arrow 2). In response, the O-RU 2001 starts a measurement-reporting notification timer (as shown by block 4003) having a specified notification interval, and the O-RU 2001 initiates an RPC for a reply (as shown by the process arrow 3). Subsequently, the O-RU 2001 performs a power measurement reporting loop, in which the O-RU 2001 sends, upon expiration of each notification interval specified by the measurement-reporting notification timer (as shown at block 4003), a power measurement report (as shown by the process arrow 4).

In the periodic power measurement request message sent according to the method shown in FIG. 4, the SMO/O-RU controller 1003 can include the following:

a) Measurement frequency start: Frequency of the lowest end of the total measured frequency band in Hz.

b) Measurement frequency end: Frequency of the highest end of the total measured frequency band in Hz.

c) Measurement bandwidth per channel: Measurement bandwidth in Hz to be used by CBSD to perform the Received Power measurement.

d) Measurement duration per channel: Measurement duration per channel in microseconds, milliseconds, seconds, or in number of OFDM symbols or number of slots.

e) Measurement periodicity for which the O-RU does the measurements: The periodicity in milliseconds, seconds, minutes, hours, or in number of OFDM symbols or number of slots for which the O-RU scans all the channels in the assigned band (determined by Measurement frequency start and Measurement frequency end).

f) Reporting periodicity for which the O-RU report the measurements: The reporting periodicity in milliseconds, seconds, minutes, hours, or in number of OFDM symbols or number of slots for which the O-RU report the spectrum measurement results for all the channels in the band back to the SMO/O-RU controller.

In another example embodiment of the method according to the present disclosure, the SMO/O-RU controller 1003 can include at least one of the following fields in the periodic power measurement request message.

Total number of measured channels: Total number of channels to be measured by the O-RU.

Measurement periodicity for which the O-RU does the measurements: The periodicity in milliseconds, seconds, minutes, hours, number of OFDM symbols, or number of slots for which the O-RU scans/measures all the channels specified below.

Reporting periodicity for which the O-RU report the measurements: The reporting periodicity in milliseconds, seconds, minutes, hours, number of OFDM symbols, or number of slots for which the O-RU report the spectrum measurement results for all the channels specified back to the SMO/O-RU controller.

A list of channels, where the measurements are requested. For each channel, the following can be included:

a) Measurement channel frequency start: Frequency of the lowest end of the measured frequency channel in Hz.

b) Measurement channel frequency end: Frequency of the highest end of the measured frequency channel in Hz.

c) Measurement bandwidth per channel: Measurement bandwidth in Hz to be used by CBSD to perform the Received Power measurement.

d) Measurement duration per channel: Measurement duration per channel in microseconds, milliseconds, seconds, or in number of OFDM symbols or number of slots.

e) Number of antennas to be used for measurements.

f) Indicator to average measurements across antennas.

g) Indicator to average measurements across measurements occasions.

h) Indicator to report raw measurement samples per antenna.

i) Indicator to report raw measurement samples per measurement occasion.

j) Indicator to report raw measurement samples but averaged across antennas.

k) Indicator to report raw measurement samples but average across measurement occasions.

l) Indicator to report raw measurement samples but average across antennas and measurement occasions.

m) start-end time array (single or multiple): Start and end measurement time for a specific channel. If multiple measurement occasions exist, then multiple timing arrays are provided; one for each measurement occasion.

start-time: Indicates the time at beginning of measurement per channel. This parameter is UTC time expressed in the format, YYYY-MMDDThh:mm:ss.

end-time: Indicates the time at end of measurement per channel. This parameter is UTC time expressed in the format, YYYY-MMDDThh:mm:ss.

In another embodiment of the invention, any of the parameters indicated above in either the trigger-based (on-demand) or the periodic measurement requests are assumed by default to be at the O-RU and the SMO/O-RU controller and no additional signaling is needed. For example, the O-RU shall always average measurements across antennas and across measurements occasions (in case of periodic measurement request).

In another embodiment example, the indicator to average or combine signals/measurements across antennas and/or measurement occasions can be configured per measurement channel or per measurement parameter. Consequently, the reported signals/measurements by the O-RU should follow the configurations by the SMO/O-RU controller.

In another example embodiment of the method according to the present disclosure, the power measurement request message is sent by the SMO/O-RU controller only once to the O-RU. In response, the O-RU performs the measurement periodically for the entire CBRS band and for each 10 MHz channel, for example, and reports the measurements results periodically via measurement notifications. In the power measurement request message of this example embodiment, the SMO/O-RU controller can include the following:

a) Measurement duration per channel: Measurement duration per channel in microseconds, milliseconds, seconds, or in number of OFDM symbols or number of slots.

b) Measurement periodicity for which the O-RU does the measurements: The periodicity in milliseconds, seconds, minutes, hours, or in number of OFDM symbols or number of slots for which the O-RU scans all the channels in the assigned band (determined by Measurement frequency start and Measurement frequency end).

c) Reporting periodicity for which the O-RU reports the measurements: The reporting periodicity, e.g., in milliseconds, seconds, minutes, hours, or in number of OFDM symbols or number of slots, for which the O-RU reports the spectrum measurement results for all the channels in the band to the SMO/O-RU controller.

In another example embodiment of the method according to the present disclosure, the O-RU executes and reports measurements results to the SMO/O-RU controller in a measurement response message either after receiving the measurement request message or periodically if the relevant parameter is included in the measurement request message. The measurement response message can include the following parameters:

a) received-power-measurement: An array of separate reports measured as Received Power. For each object, the O-RU can include the following sub-parameters:

i) measured-low-frequency: Frequency of the lowest end of the measured frequency range in Hz per channel.

ii) measured-high-frequency: Frequency of the highest end of the measured frequency range in Hz per channel. iii) Measured channel bandwidth: Bandwidth of the measured channel in Hz iv) start-time: Indicates the time at beginning of measurement per channel. This parameter is UTC time expressed in the format, YYYY-MMDDThh:mm:ss.

v) end-time: Indicates the time at end of measurement per channel. This parameter is UTC time expressed in the format, YYYY-MMDDThh:mm: ss.

vi) received-power (single or multiple arrays): Received Power measurement in units of dBm. The range of this parameter can be, e.g., −100 dBm to −25 dBm. The Received Power is measured over the frequency range from measured-low-frequency (the lower bound) to measured-high-frequency (the upper bound). Received power per measurement occasion per antenna. These received power measurements can be averaged across antennas and/or measurement occasions based on the trigger values below. If raw measurements are to be sent instead, this field can be set to the default value.

vii) Raw received signal samples (single or multiple arrays): Received signal samples per measurement occasion per antenna. These samples can be averaged across antennas and/or measurement occasions based on the trigger values below. If received power is to be sent instead, this field can be set to the default value.

viii) Number of antennas used to measure the received power over a specific channel.

ix) Number of measurements occasions per channel.

x) Average across antennas indicator:

If this field is true, then the O-RU needs to include the average measurements across antennas.

If this field is false, then the O-RU needs to include measurements separately for different antennas.

xi) Average across measurements occasions indicator:

If this field is true, then the O-RU needs to include the average measurements across measurements occasions.

If this field is false, then the O-RU needs to include measurements separately for different measurement occasions.

xii) Raw Measurements indicator:

If this field is true, the O-RU shall report the received signal samples as is to the O-DU.

If this field is false, the O-RU shall calculate the received power of the received signal samples across the measurement duration.

xiii) Min value of the received power and the time for this specific measurement. Time is UTC time expressed in the format, YYYY-MMDDThh:mm:ss. If received signal samples are reported instead, this field can be set to default value.

xiv) Max value of the received power and the time for this specific measurement. Time is UTC time expressed in the format, YYYY-MMDDThh:mm:ss. If received signal samples are reported instead, this field can be set to default value.

In an example embodiment of the method according to the present disclosure, the SMO/O-RU controller can configure a measurement periodicity that is equal to the reporting periodicity, and the O-RU reports the measurement results once after each measurement. Alternatively, in another example embodiment of the method according to the present disclosure, the SMO/O-RU controller can configure a measurement periodicity that is less than the reporting periodicity. In this case, the O-RU averages the measurement results per channel across different measurements occasions since the previous measurement report, and the O-RU reports the averaged measurement results to the SMO/O-RU controller.

In another example embodiment of the present disclosure, O-RAN section type 0 can be used to silence the O-RU operation over a specific channel in order to do measurements for this specific channel.

In another example embodiment, the SMO/O-RU controller may configure the O-RU to report the received signal power in units of 5 MHz or 10 MHz, or the raw received signal samples, or do local processing and report the parameters shown above such as channel usability, PCI, RSRP, RSRQ, etc.

Figure 5:
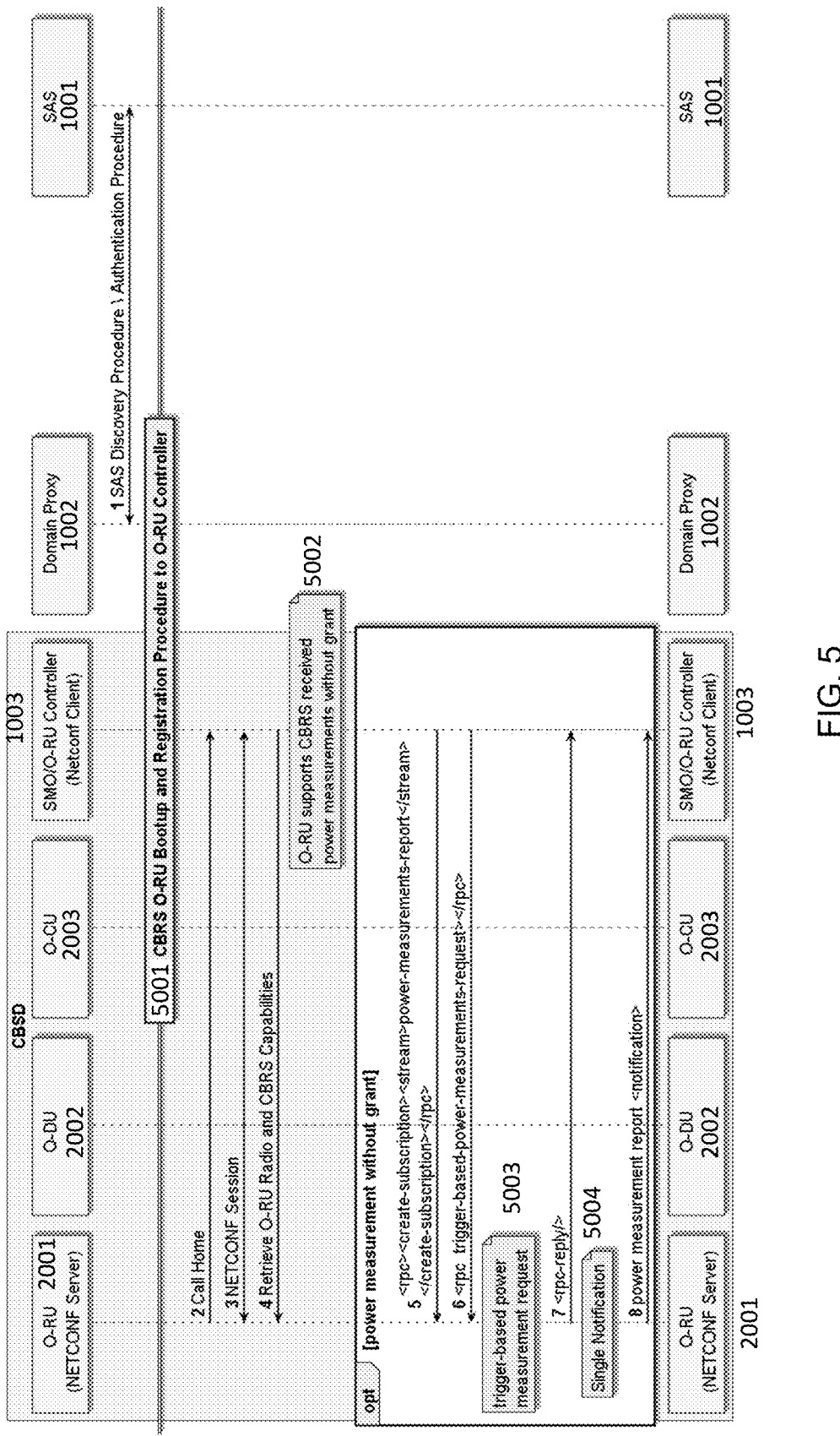
FIG. 5 illustrates the call flow for CBRS O-RU boot-up according to an example embodiment of the method.
Figure 6:
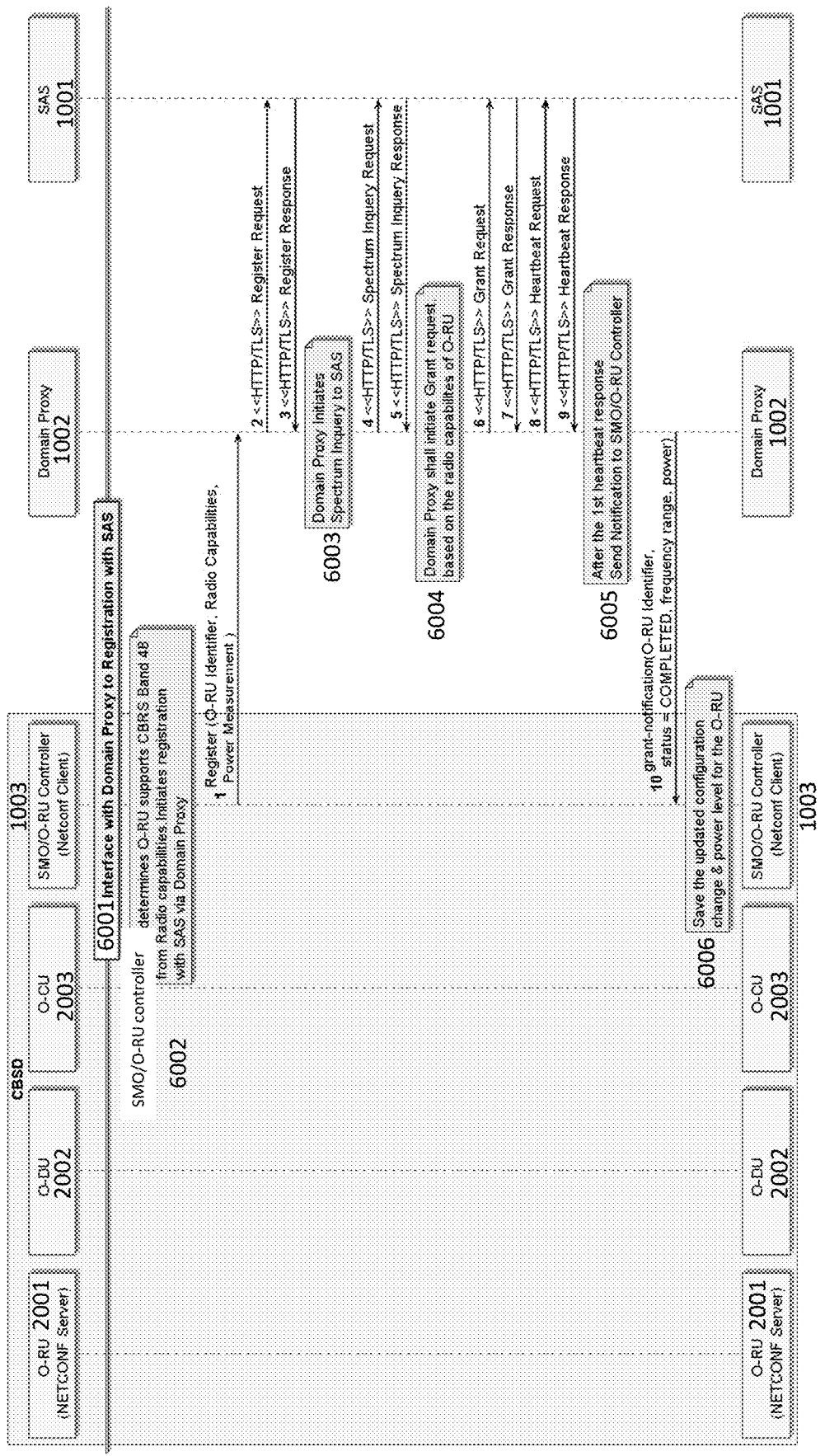
FIG. 6 illustrates the call flow for SMO/O-RU interfacing with DP and SAS according to an example embodiment of the method.
Figure 7:
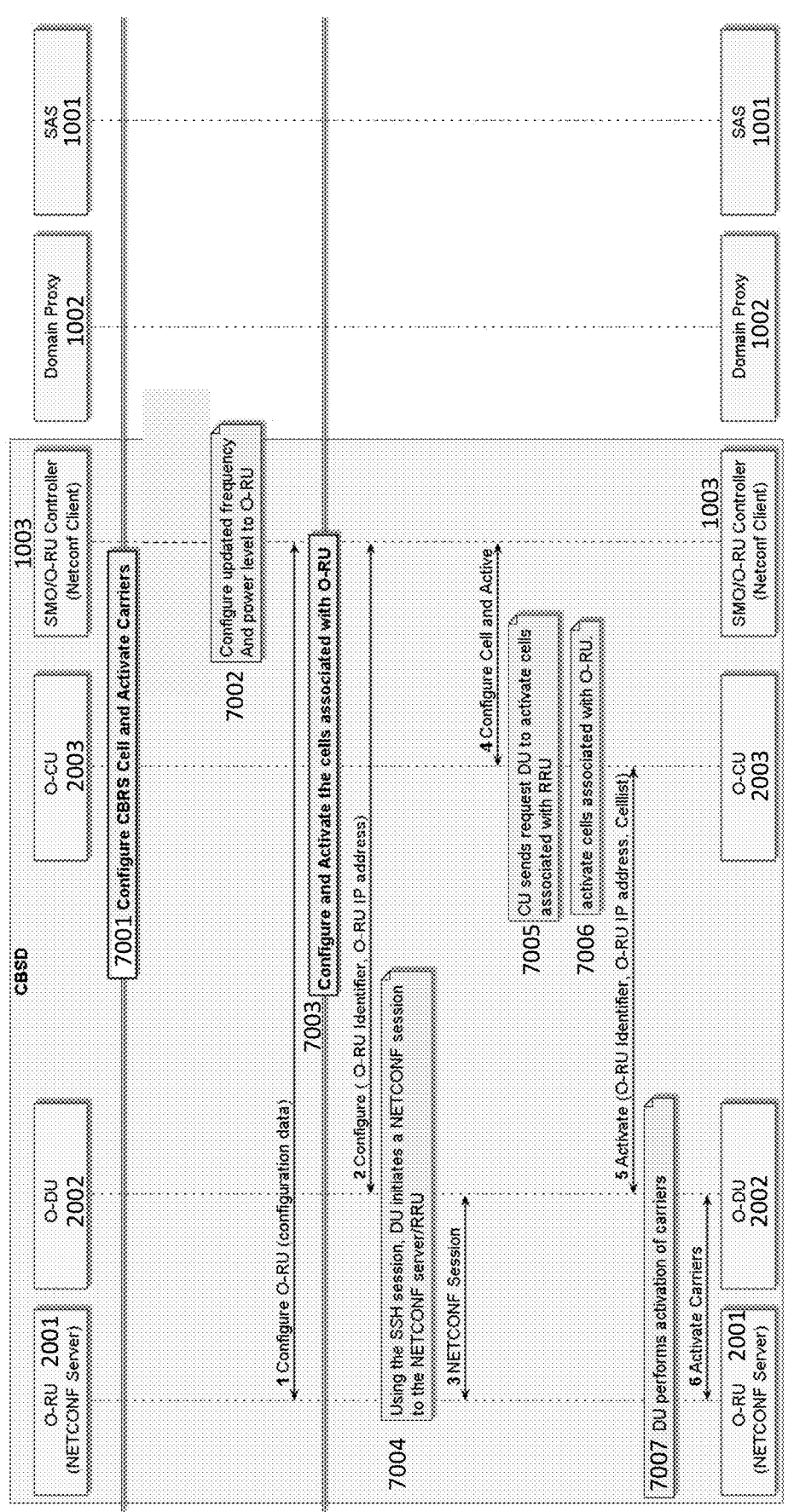
FIG. 7 illustrates the call flow for CBRS O-RU configuration and activation of cells associated with O-RU according to an example embodiment of the method.

FIGS. 5, 6 and 7 show different parts of the overall call flow for an example CBRS operation in an O-RAN-based architecture. As a brief summary, FIG. 5 shows the call flow for CBRS O-RU boot-up; FIG. 6 shows the call flow for SMO/O-RU interfacing with DP and SAS; and FIG. 7 shows the call flow for CBRS O-RU configuration and activation of cells associated with O-RU. The overall call flow for the method according to the present disclosure includes the following:

1) SAS Discovery Procedure (shown as part of process arrow 1 in FIG. 5):

a. SAS URL is provisioned in the SMO/O-RU controller 1003, and the SMO/O-RU controller 1003 then provides the SAS URL to the DP 1002 during system startup.

b. DP 1002 and SAS 1001 execute the SAS discovery procedure for the CBSDs to get connected to the SAS 1001.

2) Authentication Procedure (shown as part of process arrow 1 in FIG. 5):

a. Authentication procedure between SAS 1001 and DP 1002 is executed.

b. Authentication between O-RU 2001 and SMO/O-RU controller 1003 is executed.

c. In an alternative example embodiment of the method, the SMO/O-RU controller 1003 can communicate directly to the SAS 1001 in case of a single CBSD.

3) CBRS O-RU bootup and registration procedure to SMO/O-RU controller (starting at block 5001 shown in FIG. 5):

a. Call home (shown by process arrow 2 in FIG. 5): O-RU 2001 (NETCONF Server) to the SMO/O-RU controller 1003 (NETCONF client).

b. NETCONF session establishment (shown by process arrow 3 in FIG. 5) is executed between the O-RU 2001 (NETCONF Server) and the SMO/O-RU controller 1003 (NETCONF client).

c. O-RAN O-RU registration with SMO/O-RU controller:

i. SMO/O-RU controller 1003 retrieves O-RU 2001 radio and CBRS capabilities from O-RU 2001 (shown by process arrow 4 in FIG. 5).

ii. If O-RU 2001 is CBRS-capable, O-RU 2001 includes the CBRS capabilities/parameters in cbrs-ru-cap data, e.g., fccId, cbrs-device-category, userId, installation parameters, grouping parameters, call sign, and measurement-capability.

iii. SMO/O-RU controller 1003 identifies, based on the cbrs-ru-cap data, whether the O-RU supports a) received power with grant, b) received power without grant, or c) no measurements at all.

4) CBRS O-RU Measurement Procedure:

a. If measurement of "RECEIVED_POWER_WITHOUT_GRANT" is supported by the O-RU 2001 (as shown at block 5002), the SMO/O-RU controller 1003 triggers the O-RU measurement procedure as described below.

b. O-RU measurement procedure:

i. Measurement Request Message from SMO/O-RU controller 1003 to O-RU 2001 is sent (as shown by process arrow 6 in FIG. 5, which occurs after power-measurement-report stream is created as shown by process arrow 5). In the example embodiment shown in FIG. 5, the measurement request is shown as a "trigger-based power measurement request" (also referred to as "on-demand power measurement request") (as shown at block 5003), but the measurement request can be a "periodic power measurement request," instead.

ii. O-RU 2001 sends an RPC reply (process arrow 7 in FIG. 5) and performs spectrum measurements based on the received parameters contained in the measurement request message from SMO/O-RU controller 1003.

iii. Measurement Notification Message from O-RU 2001 to SMO/O-RU controller 1003 is sent.

1. If a trigger-based (i.e., on-demand) power measurement request was made (as shown in FIG. 5), a single measurement notification (shown by block 5004 in FIG. 5) is sent to the SMO/O-RU controller 1003 (process arrow 8 in FIG. 5).

2. Alternatively, if a periodic power measurements request was made, the measurement notification message is sent periodically from the O-RU 2001 to the SMO/O-RU controller 1003 after each measurement (as previously described in connection with FIG. 4).

iv. SMO/O-RU controller 1003 forwards the measurement report to DP 1002 (as shown in process arrow 1 in FIG. 6).

c. If measurement of "RECEIVED_POWER_WITH_GRANT" is supported (instead of "RECEIVED_POWER_WITHOUT_GRANT") by the O-RU 2001, then do not initiate measurement at this point in time, and wait until step 9) discussed below).

5) Once SMO/O-RU controller 1003 determines (as shown at box 6002, based on the radio capabilities of the O-RU) that the O-RU supports CBRS, SMO/O-RU controller 1003 sends the CBRS capabilities of O-RU 2001 to the DP 1002 (shown as part of "Register" process arrow 1 in FIG. 6, which in turn is part of the call flow section starting at block 6001 labeled "Interface with Domain Proxy to registration with SAS"). As shown by the process arrow 1 in FIG. 6, the registration information sent from the SMO/O-RU controller 1003 to DP 1002 includes O-RU identifier, O-RU radio capabilities, and power measurement.

6) CBRS O-RU registration with SAS involves the following:

i. Registration Request sent from DP 1002 to SAS 1001 (as shown by process arrow 2 in FIG. 6); and ii. Registration Response sent from SAS 1001 to DP 1002 (as shown by process arrow 3 in FIG. 6)

7) As shown at block 6003 in FIG. 6, DP 1002 initiates CBRS O-RU Spectrum Inquiry Procedure with the SAS, which includes:

a. Spectrum inquiry Request (as shown by process arrow 4 in FIG. 6) sent from DP 1002 to SAS 1001, which Request includes power measurement report (measReport) if "RECEIVED_POWER_WITHOUT_GRANT" is supported and the DP 1002 has received the measReport from the SMO/O-RU controller 1003.

b. Spectrum inquiry Response sent from SAS 1001 to DP 1002 (as shown by process arrow 5 in FIG. 6).

8) As shown at block 6004 in FIG. 6, DP 1002 initiates CBSD Grant Procedure with the SAS 1001, which includes:

a. Grant Request sent from DP 1002 to SAS 1001 (as shown by process arrow 6 in FIG. 6).

b. Grant Response sent from SAS 1001 to DP 1002 (as shown by process arrow 7 in FIG. 6).

9) Measurement Procedure Trigger for "RECEIVED_POWER_WITH_GRANT" Case (continuing from step 4) c. discussed above) is as follows. If "RECEIVED_POWER_WITH_GRANT" is supported and the SAS has assigned a grant to the RU, then:

a. The DP 1002 triggers the measurement procedure towards the SMO/O-RU controller 1003.

b. The SMO/O-RU controller 1003 triggers the measurement procedure (e.g., as described above in connection with FIGS. 3 and 4) to the O-RU 2001. Both trigger-based (on-demand) measurements and periodic measurements are possible.

10) CBRS O-RU Heartbeat Procedure involves the following:

a. Heartbeat Request sent from DP 1002 to SAS 1001 (as shown by process arrow 8 in FIG. 6).

b. Heartbeat Response sent from SAS 1001 to DP 1002 (as shown by process arrow 9 in FIG. 6).

11) As shown at block 6005 of FIG. 6, after receiving the first Heartbeat Response, DP 1002 sends to SMO/O-RU controller 1003 the notifications received from SAS 1001 (e.g., heartbeat response, grant response, etc.). As shown in detail by process arrow 10 of FIG. 6, the grant notification sent from DP 1002 to SMO/O-RU controller 1003 can include, e.g., O-RU identifier, grant status=COMPLETED, frequency range, and power.

12) As shown at block 6006 of FIG. 6, SMO/O-RU controller 1003 saves the updated configuration data (e.g., center frequency and the power level) for configuring the O-RU 2001 with the required parameters to enable operation over the CBRS band.

13) Next, the portion of the call flow for configuring CBRS cell and activating carriers is illustrated in FIG. 7 (starting at block 7001 labeled "Configure CBRS Cell and Activate Carriers"). After the first heartbeat response from the SAS 1001 (process arrow 9 shown in FIG. 6), the CBSD transitions from the granted state to the authorized state, and hence the SMO/O-RU controller 1003 can activate the carrier for over the air (OTA) operation.

a. As shown at block 7002 and process arrow 1 in FIG. 7, SMO/O-RU controller 1003 configures O-RU 2001 by using configuration data (e.g., updated frequency information and power level).

b. As shown by the call flow section starting at block 7003 (labeled "Configure and Activate the cells associated with O-RU"), the following steps are performed:

i. The SMO/O-RU controller 1003 sends configuration data (e.g., O-RU identifier and O-RU IP address) to the O-DU 2002 (as shown by process arrow 2 in FIG. 7).

ii. Using a Secure Shell (SSH) session, the O-DU 2002 initiates a NETCONF session to the O-RU 2001 serving as the NETCONF server (as shown by block 7004 and process arrow 3 in FIG. 7).

iii. The SMO/O-RU controller 1003 sends configuration request to the O-CU 2003 to configure and activate cells associated with O-RU (as shown by process arrow 4 in FIG. 7).

iv. The O-CU 2003 sends a request to O-DU 2002 to activate cells associated with O-RU 2001 (as shown by blocks 7005, 7006 and process arrow 5 shown in FIG. 7), which request can include, e.g., O-RU identifier, O-RU IP address, and cell list.

v. The O-DU 2002 performs activation of carriers (as shown by block 7007 and process arrow 6).

14) In addition to the steps shown in FIGS. 5-7 and described above, the overall call flow for an example CBRS operation in an O-RAN-based architecture can include the following:

a) CBRS O-RU Grant Relinquishment Procedure (optional, if needed as part of alternative embodiment), in which i) DP 1002 sends to SAS 1001 a Relinquishment Request (DP to SAS), and ii) SAS 1001 sends to DP 1002 a Relinquishment Response.

b) CBRS O-RU Deregistration Procedure (optional, if needed as part of alternative embodiment), in which i) DP 1002 sends to SAS 1001 a Deregistration Request (DP to SAS), and ii) SAS 1001 sends to DP 1002 a Deregistration Response.

In an example embodiment of the method according to the present disclosure, the SMO/O-RU controller 1003 manages and maintains, e.g., the following attributes that are used during the CBSD registration procedure with the SAS: userId; installationParam; groupingParam; and Call-sign.

In an example embodiment of the method according to the present disclosure, the SMO/O-RU controller 1003 can send a message to the O-RU 2001 to deactivate the carrier(s)

The YANG module for an example CBRS operation in an O-RAN-based architecture can be described as follows. This is merely one example, and several other embodiments can be used as per the description of the current invention. Furthermore, units shown below (e.g., int16, uint32, etc.) are merely examples which don't preclude other embodiments.

```
module: o-ran-cbrs
    +--ro cbrs-ru-cap
    |   +--ro fccId                                      string
    |   +--ro cbrs-device-category?                            enumeration
    |   +--ro call-sign?                                 String
    |   +--ro userId                                     String
    |   +--ro grouping-param                                 String
    |   +--ro measurement-capability?                            enumeration
    +--rw cbrs-ru-installation-parameters
        +--rw location
        |   +--rw latitude?                    geographic-coordinate-degree
        |   +--rw longitude?                   geographic-coordinate-degree
        |   +-rw heightType?                   enumeration
        |   +--rw height?                      decimal64
        +--rw indoor-deployment?                             boolean
        +--rw antenna-azimuth?                           int16
        +--rw antenna-down-tilt?                         int16
        +--rw antenna-gain?                              int16
        +--rw antenna-beamwidth?                             uint16
  rpcs:
    +---x on-demand-power-measurements-request
    |   +---w input
    |   |   +---w measurement-frequency-start                     uint64
    |   |   +---w measurement-frequency-end                       uint64
    |   |   +---w measurement-bandwidth-per-channel                   bandwidth
    |   |   +---w measurement-duration-per-channel                    uint32
    |   +--ro output
    |   +--ro status                           enumeration
    |   +--ro error-message?                   string
    +---x periodic-power-measurements-request
        +---w input
        |   +---w measurement-frequency-start                     uint64
        |   +---w measurement-frequency-end                       uint64
        |   +---w measurement-bandwidth-per-channel                   bandwidth
        |   +---w measurement-duration-per-channel                    uint32
        |   +---w measurement-periodicity                        uint32
        |   +---w measurement-reporting-periodicity                  uint32
        +--ro output
            +--ro status                       enumeration
            +--ro error-message?               string
  notifications:
    +---n power-measurements-report
        +--ro received-power-measurement* [measured-low-frequency]
            +--ro measured-low-frequency                         uint64
            +--ro measured-high-frequency                        uint64
            +--ro start-time?                       yang:date-and-time
            +--ro end-time?                         yang:date-and-time
            +--ro received-power?                        int16
``` before sending a relinquishment request message from the SMO/O-RU controller 1003 to the SAS 1001.

In an example embodiment of a method according to the present disclosure, new functional characteristics of a DP is defined in the O-RAN architecture to communicates with the SAS on behalf of multiple CBSDs. While the north-bound interface of the DP, i.e., DP to SAS, is as defined in the WInnForum, the south-bound interface of the DP, i.e., DP to SMO/O-RU controller, is to be defined as follows: the south-bound interface of the DP needs to carry all the parameters needed for the north-bound interface of the DP. One function of the DP is to aggregate these parameters (all the parameters needed for the north-bound interface of the DP) from multiple CBSDs and send them in the correct format to the SAS. In addition, the DP shall forward the received messages from the SAS to the SMO/O-RU controller after executing appropriate formatting (i.e., removing headers, assemble O-RAN messages, etc.).

Glossary

3GPP: 3rd Generation Partnership Project
BS: Base Station
CA: Carrier Aggregation
CAPEX: Capital Expenditures
CBRS: Citizens Broadband Radio Service
CBRS-A: CBRS Alliance
CBSD: Citizens Broadband Radio Service Devices
CCG: Common Channel Group
CFR: Code of Federal Regulation
CPI Certified Professional Installer
CP: Cyclic Prefix
CxG: Coexistence Group
CxM: Coexistence Manager
DL: Downlink
DP: Domain Proxy
EARFCN: E-UTRA Absolute Radio Frequency Channel Number ECGI: E-UTRAN Cell Global Identifier EIRP: Effective Isotropic Radiated Power eNB: evolved NodeB (applies to LTE)

FS2: Frame Structure 2 corresponding to LTE-TDD operation in 3GPP Band 48.

FS3: Frame Structure 3 corresponding to LTE-LBT operation.

FSS: Fixed Satellite Service

GAA: General Authorized Access.

gNB: Next generation NodeB (applies to NR)

GNSS: Global Navigation Satellite System

GPS: Global Positioning System

GWBL: Grandfathered Wireless Broadband Licensee

HAAT: Height Above Average Terrain

ICG: Interference Coordination Group

NMS: Network Management System

NR-ARFCN: new radio Absolute Radio Frequency Channel Number

NCGI: NR Cell Global Identifier

O-DU: O-RAN Distributed Unit

OFDM: Orthogonal Frequency-Division Multiplexing

O-RU: O-RAN Radio Unit

OPEX: Operating Expenditures

PAL: Priority Access License

PPA: PAL Protection Area

PCL: Physical cell Identity

RAT: Radio access technology

RPC: Remote procedure call

RSSI: Received signal strength indicator

RSRP: Reference Signal Received Power

RSRQ: Reference Signal Received Quality

SAS: Spectrum Access System

SMO: Service Management and Orchestration

TLS: Transport Layer Security.

Definitions

CBRS band: The 3550-3700 MHz Citizens Broadband Radio Service band.

CBSD Registration: The procedure by which a CBSD indicates to a SAS its intention to operate. Successful registration implies a validation by the SAS that the CBSD has been FCC certified and confers on the CBSD the right to be authorized by the SAS to operate in accordance with a Grant. During the registration process, each CBSD provides a fixed location, unique identifiers (e.g., owner information, device information), Group membership, and radio-related capabilities. A successful registration procedure concludes with the SAS providing a unique identifier for that CBSD.

CBSD User: The registered entity that has operational responsibility for the CBSD.

Channel: the contiguous frequency range between lower and upper frequency limits.

Citizens Broadband Radio Service Device (CBSD): Fixed Stations, or networks of such stations, that operate on a Priority Access or General Authorized Access basis in the Citizens Broadband Radio Service consistent with FCC regulations. For CBSDs which comprise multiple nodes or networks of nodes, CBSD requirements apply to each node even if network management and communication with the SAS is accomplished via a single network interface.

CCG (Common Channel Group): A group of CBSDs, that are part of the same ICG, requesting a common primary channel assignment.

Connected Set: A set of CBSDs represented by the largest set of vertices of a graph created at the SAS or CxM, in which any two vertices of the set are connected to each other through at least one path in the graph.

CxG (Coexistence Group): A group of CBSDs that abide by a common interference management policy which is used to coordinate their interference within the group.

CxM (Coexistence Manager): A logical entity responsible for managing coexistence between GAA users within a CxG in coordination with SAS.

C-plane: Control Plane: refers specifically to real-time control between O-DU and O-RU, and should not be confused with the UE's control plane.

DL: DownLink: data flow towards the radiating antenna (generally on the LLS interface)

Domain Proxy (DP): An entity engaging in communications with the SAS on behalf of multiple individual CBSDs or networks of CBSDs. The Domain Proxy can also provide a translational capability to interface legacy radio equipment in the 3650-3700 MHz band with a SAS to ensure compliance with FCC Part 96 rules.

Grant: The authorization provided by a SAS to a CBSD, subject to a Heartbeat exchange, to transmit using specified operating parameters. Grants are identified by a unique Grant identifier. Once issued, a Grant's operating parameters are never changed; if new or modified operating parameters are required, then a new Grant must be obtained. The Grant's operating parameters are maximum EIRP and Channel. A Grant can be in different states as will be explained in this FRS.

Group: A collection of CBSDs which are provided a special, common form of management by the SAS. The nature of the special management is dependent on Group type.

ICG (Interference Coordination Group): A group of CBSDs belonging to the same CxG indicating that they can manage their own interference within the group, and do not need channel orthogonalization even if they have overlapping coverage.

LLS: Lower Layer Split: logical interface between O-DU and O-RU when using a lower layer (intra-PHY based) functional split.

M-Plane: Management Plane: refers to non-real-time management operations between the O-DU and the O-RU O-CU: O-RAN Control Unit—a logical node hosting PDCP, RRC, SDAP and other control functions O-DU: O-RAN Distributed Unit: a logical node hosting RLC/MAC/High-PHY layers based on a lower layer functional split.

O-RU: O-RAN Radio Unit: a logical node hosting Low-PHY layer and RF processing based on a lower layer functional split. This is similar to 3GPP's "TRP" or "RRH" but more specific in including the Low-PHY layer (Fast Fourier Transform (FFT)/inverse Fast Fourier Transform (iFFT), Physical Random Access Channel (PRACH) extraction).

OTA: Over the Air

PAL reserved channel: A 10 MHz channel in the range of 3550-3650 that a SAS may establish for exclusive use of a set of one or more CBSDs that are registered as belonging to a PPA based upon acquired PAL rights.

Spectrum Access System (SAS): A system that authorizes and manages use of spectrum for the Citizens Broadband Radio Service in accordance with FCC regulations.

S-Plane: Synchronization Plane: refers to traffic between the O-RU or O-DU to a synchronization controller which is generally an IEEE 1588 Grand Master (however, Grand Master functionality may be embedded in the O-DU).

U-Plane: User Plane: refers to IQ sample data transferred between O-DU and O-RU.

UL: UpLink: data flow away from the radiating antenna (generally on the LLS interface).

What is claimed is:

1. A method of operating an Open Radio Access Network (O-RAN) fronthaul interface between O-RAN radio unit (O-RU) and an O-RU controller for controlling the O-RU, comprising:

sending, from the O-RU to the O-RU controller, a message informing whether the O-RU supports Citizens Broadband Radio Service (CBRS) operation;

when the O-RU supports the CBRS operation, sending from the O-RU to the O-RU controller a report of capabilities of the O-RU, wherein the report includes:

i) an indication of whether the O-RU supports spectrum measurement comprising power measurement;

ii) when the O-RU supports spectrum measurement comprising power measurement, one of an indication the O-RU supports measurement without grant from a Spectrum Access System (SAS) or an indication the O-RU supports measurement with grant from the SAS; and iii) at least one of Federal Communications Commission certification identification (FCC ID) for the O-RU, Citizens Broadband Radio Service Device (CBSD) category for the O-RU, user registration identification (userId) for CBRS, certified professional installer (CPI) signature data, installation parameters, grouping parameters, and a call sign device identifier provided by the FCC;

when the O-RU supports measurement with a grant from the SAS, the O-RU controller sends a power measurement request message to the O-RU to configure the O-RU to perform a power measurement only after a grant has been issued from the SAS and based on at least one configuration parameter included in the measurement request message, said configuration parameter including at least one of: i) measurement frequency start; ii) measurement frequency end; iii) measurement bandwidth per channel; and iv) measurement duration per channel, and wherein the power measurement request message is sent by the O-RU controller via one of management plane (M-plane) and control plane (C-plane);

when the O-RU supports measurement without a grant from the SAS, the O-RU controller sends a power measurement request message to the O-RU to configure the O-RU to perform a power measurement one of i) before initiating the registration procedure with the SAS, ii) after initiating the registration procedure with the SAS, or iii) after reception of CBSD registration response from the SAS, the power measurement being performed based on at least one configuration parameter included in the measurement request message, said configuration parameter including at least one of: i) measurement frequency start; ii) measurement frequency end; iii) measurement bandwidth per channel; and iv) measurement duration per channel, and wherein the power measurement request message is sent by the O-RU controller via one of management plane (M-plane) and control plane (C-plane);

sending, by the O-RU, a report message to the O-RU controller, said report message including results of the power measurement performed by the O-RU; and forwarding, by the O-RU controller, the report message to a domain proxy (DP) which is interfaced with the SAS through an interface and is configured to engage in communications with the SAS on behalf of multiple individual CBSDs or networks of CBSDs to perform registration of said CBSDs with the SAS.

2. The method of claim 1, wherein at least one of:

i) the O-RU controller is implemented in one of Service Management and Orchestration (SMO) unit, O-RAN distributed unit (O-DU), Network Management System (NMS), and as a separate node;

ii) at least one of the capability parameters is included by the O-RU in a capability YANG module; and iii) the CPI signature data is included in a capability Yang module if a CPI enters the CPI data directly into the O-RU.

3. The method of claim 1, further comprising:

when the O-RU controller receives indication the O-RU supports CBRS operation, performing the following:

initiating, by the O-RU controller, CBSD registration process for the O-RU with the SAS by i) sending a CBSD registration request to the SAS, and ii) receiving a CBSD registration response from the SAS.

4. The method of claim 3, further comprising:

aggregating, by the O-RU controller, i) registration information from the O-RU for the CBSD registration request, and ii) registration information from at least one other O-RU for a corresponding CBSD registration request;

sending, by the O-RU controller, the aggregated registration information to the domain proxy (DP); and performing, by the DP, the registration process by i) sending the CBSD registration requests to the SAS, and ii) receiving corresponding CBSD registration responses from the SAS.

5. The method of claim 1, further comprising:

activating, by the O-RU controller, a carrier for over the air (OTA) operation only after a CBSD corresponding to the O-RU is transitioned from a granted state to an authorized state.

6. A method of operating an Open Radio Access Network (O-RAN) fronthaul interface between O-RAN radio unit (O-RU) and an O-RU controller for controlling the O-RU, said O-RU supporting Citizens Broadband Radio Service (CBRS), said method comprising:

sending, by the O-RU controller, a power measurement request message to the O-RU requesting the O-RU to perform a power measurement based on at least one configuration parameter included in the measurement request message, said configuration parameter including at least one of: i) measurement frequency start; ii) measurement frequency end; iii) measurement bandwidth per channel; and iv) measurement duration per channel, and wherein the power measurement request message is sent by the O-RU controller via one of management plane (M-plane) and control plane (C-plane);

sending, by the O-RU, a report message to the O-RU controller, said report message including results of the power measurement performed by the O-RU; and forwarding, by the O-RU controller, the report message to a domain proxy (DP) which is interfaced with a Spectrum Access System (SAS) through an interface and is configured to engage in communications with the SAS on behalf of multiple individual Citizens Broadband Radio Service Devices (CBSDs) or networks of CBSDs to perform registration of said CBSDs with the SAS.

7. The method of claim 6, wherein the measurement request message is sent by the O-RU controller for each time measurement desired from the O-RU.

8. The method of claim 6, wherein:

the measurement request message includes the measurement duration per 10 MHz channel;

the measurement performed includes the entire CBRS band; and the measurement bandwidth is set to 10 MHz.

9. The method of claim 6, wherein the power measurement request message is sent by the O-RU controller only once for time measurements desired from the O-RU.

10. The method of claim 9, wherein:

the power measurement request message further includes at least one of: v) measurement periodicity for which the O-RU performs the measurements; and vi) reporting periodicity for which the O-RU reports the measurements; and the O-RU performs measurements periodically and reports the measurements results periodically via measurement notifications to the O-RU controller.

11. The method of claim 10, wherein:

when the O-RU controller specifies a measurement periodicity less than the reporting periodicity, the O-RU i) averages the measurement results per channel across different measurements occasions since the previous measurement report, and ii) reports the averaged measurement results to the O-RU controller.

12. The method of claim 9, wherein:

the power measurement request message includes i) the measurement duration per 10 MHz channel, ii) measurement periodicity for which the O-RU performs the measurements, and iii) reporting periodicity for which the O-RU reports the measurements;

the O-RU performs measurements periodically for the entire CBRS band and for each 10 MHz channel; and the O-RU reports the measurements results periodically via measurement notifications to the O-RU controller.

13. The method of claim 6, wherein:

the O-RU performs the power measurement and reports measurement results, via one of the management plane (M-plane) or control plane (C-plane), to the O-RU controller in a power measurement response message sent one of i) after receiving the power measurement request message or ii) periodically, if at least one parameter for periodic measurements is included in the power measurement request message;

the power measurement response message comprising at least one received-power measurement report including at least one of:

i. frequency of the lowest end of the measured frequency range in Hz per channel;

ii. frequency of the highest end of the measured frequency range in Hz per channel;

iii start time at beginning of measurement per channel, wherein the start time is represented in Universal Time Coordinated (UTC) time expressed in the format YYYY-MMDDThh: mm: ss;

iv. end time of measurement per channel, wherein the start time is represented in Universal Time Coordinated (UTC) time expressed in the format YYYY-MMDDThh: mm: ss;

v. received power measurement in units of dBm and in the range of −100 dBm to −25 dBm, wherein the received power is measured from the frequency of the lowest end to the frequency of the highest end of the measured frequency range.

14. The method of claim 6, further comprising:

sending, from the O-RU controller, a message to the O-RU to deactivate a previously activated carrier; and subsequently sending, from the O-RU controller, a relinquishment request message to the Spectrum Access System (SAS).

* * * * *